United States Patent Office 2,818,325
Patented Dec. 31, 1957

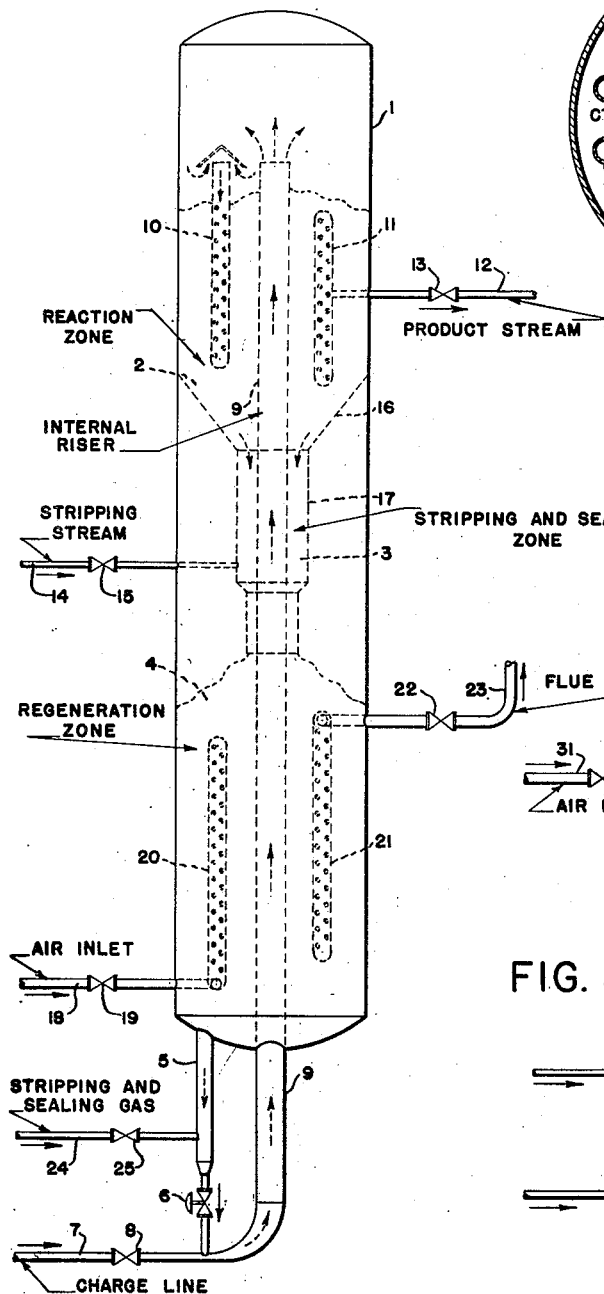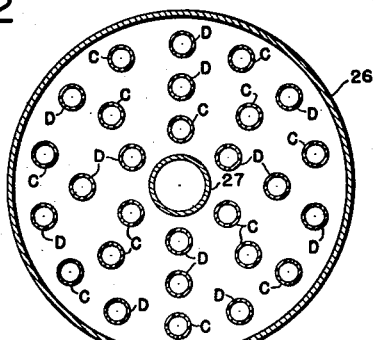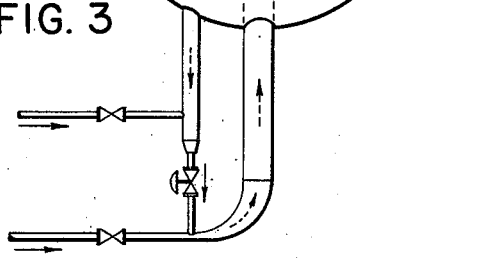

2,818,325

APPARATUS FOR CONTACTING SUBDIVIDED SOLID PARTICLES IN A COMPACT AND MOVING BED

Louis S. Kassel, Oak Park, Ill., assignor to Universal Oil Products Company, Chicago, Ill., a corporation of Delaware Application November 30, 1950, Serial No. 198,345

3 Claims. (Cl. 23—288)

This invention relates to an improved method and apparatus for effecting the continuous contacting of a relatively compact moving bed of subdivided solid particles with a fluid reactant stream, such as effecting the conversion of a hydrocarbon stream in the presence of subdivided catalyst particles.

It is an advantage of the compact moving bed conversion system to be able to maintain a continuous single bed of descending particles extending through elongated and superimposed contacting zones. For example, catalyst particles may pass downwardly in a relatively compact bed from an elongated reaction zone through a smaller cross-sectional area stripping and sealing zone to a lower regeneration zone, being contacted in the upper zone with a fluid reactant stream such as hydrocarbon vapors to effect the desired conversion, and within the lower zone by an air or oxygen stream to effect the desired reactivation of particles so that they may be recirculated to the reaction zone.

The recirculation or transporting of particles from the lower end of the regeneration zone to the upper end of the reaction zone may be accomplished by various mechanical means, however, by the use of relatively small pellets or particles, they may be transferred in a fluidized lift through a suitably placed riser line or conduit of relatively small cross-sectional area. In a preferred operation, the fluid reactant stream which is being converted in the reaction zone may be utilized to effect the fluidized lift of particles to the upper zone.

A disadvantage of contacting a relatively compact bed of particles is that relatively high pressure drops may be encountered in passing the reactant fluid or reactivating gas stream through the bed. Thus, there is a practical limit to the depth of the bed where the reactant stream passes either upwardly or downwardly through the moving bed. Further, for plants or conversion units having a large capacity the beds in each of the contacting zones tend to have impractically large ratios of diameter to depth, in order to maintain pressure drops within practical operating limits.

It is, therefore, a principal object of the present invention to provide means for contacting relatively deep beds of subdivided contact material with fluid reactant streams, without causing excessively high pressure drops between inlet and outlet zones.

It is also an object of the present invention to provide gas or vapor collecting and distributing means within confined contacting zones and within a descending bed of subdivided particles, which do not tend to block the gravity flow of the particles, and in addition permit smaller diameter vessels than would be possible for the more conventional type large capacity unit.

It is a still further object of the invention to provide vertically extending distributing and collecting means or surfaces which define distributing or collecting channels, which permit vertically elongated contacting zones as well as a plurality of vertically superimposed contacting stages within a given conversion chamber.

In a broad aspect, the present invention provides an improved method for contacting a descending substantially compact bed of subdivided solid contact material with a fluid reactant stream to maintain a relatively low pressure drop, in a manner which comprises, continuously distributing the reactant stream laterally and uniformly into the bed throughout substantially the entire vertical height thereof, passing the stream substantially horizontally through the entire horizontal cross-sectional area of the bed to a vertically extending collection zone which is spaced uniformly from the zone of distribution, and continuously withdrawing a resulting fluid product stream from the collecting zone and from the descending bed of contacted material.

The distributing or collecting systems of the present invention comprise perforated vertically extending conduits or surfaces which in turn define collecting channels or zones, with such channels having a total horizontally projected area much smaller than that of the horizontal cross-sectional area of the contacting chamber, and thus not interfering greatly with the continuous descent of the solid contacting particles. A plurality of perforated channels or conduit means may be connected by suitable headers and thus provide multiple branch collecting or distributing zones which extend vertically through a particular contacting bed. The more conventional collecting devices have utilized inverted troughs or the like to shield a major part of a perforate piping or conduit system which traverses the horizontal cross-sectional area of the contacting zone to in turn permit the separation and withdrawal of fluid product streams from within a continuously descending bed of particles. However, such collecting systems tend to block a large portion of the cross-sectional area of the conversion zone, and as hereinbefore noted, such horizontal collecting systems are normally used where the fluid stream passes either upwardly or downwardly through a depth of contacting material so that in order not to have excessively large pressure drops through a contacting zone the depth of the bed must be limited to practical operating conditions.

In a more specific embodiment, my invention comprises passing a subdivided solid catalytic material in a closed circuit through a reaction zone and at least one regeneration zone, with the catalyst being maintained in a single continuous descending bed through substantially vertically superimposed contacting zones, distributing a fluid reactant stream laterally and uniformly into the bed in the upper zone throughout substantially the entire vertical height and horizontal cross-sectional area of the bed therein, passing the reactant stream substantially horizontally through the bed transversely to its descending movement and to a vertically extended collecting zone spaced uniformly from the zone of distribution, continuously withdrawing the resulting fluid product stream from the collecting zone and discharging it from the descending bed of contact material, simultaneously distributing a regenerating gas in a substantially horizontal direction through perforate vertically extending distributing means within at least one regeneration zone, with said regenerating gas passing substantially laterally and uniformly through the entire height and horizontal cross-sectional area of said regeneration zone to a vertically extended perforate collecting zone spaced uniformly from the zone of distribution, and continuously withdrawing resulting regeneration gases from the collecting zone and from the descending bed of contact material.

In the latter embodiment, the regenerated and contacted subdivided solid particles being withdrawn from the lower portion of the lower regeneration zone are commingled with the fluid reactant stream being converted in the upper reaction zone, and the resulting commingled stream passes in a substantially disperse phase through a restricted cross-sectional area riser or conduit line to the upper portion of the reaction zone and into a vapor space maintained above the upper surface of the descending bed of solid particles therein. The vapor space above the bed in the upper portion of the reaction zone permits the particles to fall by gravity on to the descending bed thereof and provides for collecting the vapors and passing them down through channels to the perforate vertically extending distributing means. The latter in turn provides for the uniform and lateral distribution of the vapors into the compact descending bed of particles to pass uniformly and substantially horizontally into spaced collecting zones which also extend vertically throughout the contact bed of particles in the reaction zone as set forth.

Still another specific embodiment provides for maintaining a plurality of stages or contacting zones within a given confined vessel, such as for example a plurality of regeneration zones superimposed above one another within an elongated confined chamber below a superimposed reaction zone and a relatively compact bed of descending catalyst particles extending from the upper portion of the reaction zone downwardly therethrough and through the entire plurality of superimposed regeneration zones. Air or other regenerating gas is introduced through perforate vertically extending distributing means within the lowermost regeneration zone and passes therefrom substantially horizontally or laterally through the descending bed of particles to a lowermost collecting means which extends vertically and at substantially uniformly spaced distances from the zone of introduction. Partially used regeneration gases pass from the collecting zone or means through a channel to perforate vertically extending distributing means within the next higher regeneration zone, and in the latter zone the gaseous stream passes from distributing means laterally through the bed to spaced collecting means therein, the latter collecting means extending throughout substantially the entire height of the second stage of regeneration, and regeneration gases from the latter stage pass through connecting channels to distributing surfaces or means extending substantially vertically through the entire height of the next higher zone, with the regenerating gas stream passing in a similar manner through successive superimposed stages to the uppermost regeneration zone, and used regeneration gas is withdrawn from a vertically extending collecting zone in the uppermost of said zones and discharged from the descending bed of subdivided solid particles.

Where superimposed zones or stages are utilized in a single contacting vessel, the various stages or zones may be partially separated by restrictions or regions of reduced cross-section in the vessel, however, where it is not desired to reduce the vessel and the material moves downwardly at a constant flow rate, perforate distributing and collecting channels may run vertically through two successive stages. For example, a perforate tube or conduit or the like, may serve as a collecting channel in a lowermost regeneration zone and as a distributing channel in a next higher zone. In this arrangement of distributing and collecting surfaces, it is relatively important to maintain the upper end of the distributing surface spaced sufficiently from a collecting surface in a next higher stage, in order that gas or vapor flow does not pass vertically, rather than in the desired horizontal flow.

Additional embodiments and features of the improved method for contacting a descending solid bed of particles, as well as the construction and arrangement of improved gas or vapor distributing and collecting means, will be more apparent upon reference to the accompanying drawing and the following description thereof.

Figure 1 of the drawing is a diagrammatic elevational view of a single chamber contacting unit, with means indicated for passing a fluid stream substantially horzontally through each of the contacting zones to in turn contact the subdivided solid particles descending in a continuous relatively compact mass through each of the superimposed zones.

Figure 2 of the drawing is a diagrammatic cross-sectional plan view through a typical contacting chamber, indicating means for spacing distributing and collecting conduits or channels, such that the fluid stream passes laterally through substantially the entire horizontal cross-sectional area of a conversion zone.

Figure 3 of the drawing is a partial elevational view, indicating diagrammatically means for effecting both lateral and upward flow through superimposed stages or zones of contact within a single descending bed of solid material within a single confined vessel.

Referring now to the drawing, there is indicated a single vertically disposed chamber 1 adapted to maintain a continuously descending bed of subdivided solid particles extending through an upper reaction zone 2 an intermediate stripping and sealing zone 3 and a lower regeneration zone 4. For purposes of more easily explaining the operation of the present unit, it will be assumed that subdivided solid catalyst particles are being continuously contacted with a hydrocarbon reactant stream within the reaction zone and that the contaminated and carbonized catalyst particles are being contacted with an air or free oxygen-containing stream within the regeneration zone 4. The catalyst particles are preferably spherical and of a substantially uniform size so that they do not readily pack but will continuously pass downwardly in a free flowing relatively compact bed. The particles are also preferably of a small size, such as from $\frac{1}{16}''$ average diameter to the order of $\frac{3}{8}''$ average diameter, so that the particles may be transferred from the lower end of the lower contacting zone to the upper portion of the upper zone by means of gas lift or fluidization and thus maintain the continuous circulation of the catalyst through the single chamber unit.

In the continuous operation, reactivated catalyst particles are withdrawn from the lower end of the regeneration zone 4 by way of standpipe 5 and control valve 6, and become mingled with a hydrocarbon fluid stream, in either vaporous or liquid state introduced by way of line 7 and control valve 8. The charge stream is passed through line 7 and into the lower end of a riser line 9 at a sufficient velocity and in sufficient quantity to effect the fluidization of the catalyst particles becoming commingled therewith and thus transport or raise the particles in disperse phase to the upper end of the riser conduit 9, and into the upper separation section of the reaction zone 2. The vapor stream and the catalyst particles lose their velocity upon leaving the upper end of the riser line so that the particles settle by gravity to the upper surface of the continuously descending bed of particles, while the vapors enter into and are channeled downwardly through distributing means 10. The vapor distributing means 10 has a perforate vertical surface which extends substantially throughout the entire height of the descending moving bed which is maintained within the reaction zone 2, and such that vapors are passed laterally or substantially horizontally outwardly from the distributing member through the bed of particles to spaced perforate collecting means 11 which in turn connects with or communicates with an outlet line 12 having control valve 13. Operating pressures are maintained within the upper portion of the reaction zone and within the channels connecting with the perforate surface distributing means 10, as well as at the collecting means 11 and outlet header 12 so that a vapor is passed directly and laterally and from the distributing means to the collecting means. However, in accordance with the present invention it is intended to arrange the distributing and collecting means so that the vapors pass with a low pressure drop through the descending bed of particles, as well as in a manner traversing substantially the entire horizontal cross-sectional area of the reaction zone.

The distributing means 10 as well as the collecting means 11, may have various structural forms whereby a perforate surface bounds a distributing or collecting space through which the fluid or vapor medium may pass freely. For example, the perforated surface may be of wire screen, punched metal sheeting, or plates of sintered glass, and the like. The distributing channels or collecting channels may also be of a round tubular form, or alternatively of a rectangular shape, or in other instances may be of a hollow cylindrical or semi-cylindrical form. The drawing indicates diagrammatically a single distributing means and a single collecting means, however, a plurality of relatively small tubular distributing or collecting sections, may be connected by suitable header means so that a fluid stream may be distributed and collected from uniformly spaced zones or sections throughout the entire descending bed within a contacting zone.

Contacted and coked catalyst particles continuously pass from the lower end of the reaction zone 2 through a restricted cross-sectional area zone 3, to which a stripping and sealing stream such as steam is passed by way of line 14 and valve 15. In a preferable operation, the steam is introduced at a pressure suitable to maintain separate the reactant and gaseous streams of the reaction zone 2 and regeneration zone 4, with pressure drops maintained such that a major portion of the stripping steam passes upwardly through stripping zone 3 to the collecting zone 11 and outlet line 12, whereby adsorbed and occluded hydrocarbon vapors are stripped from the descending bed of catalyst particles prior to their entering into the upper portion of the regeneration zone 4. Catalyst particles continuously pass from the lower end of the stripping and sealing zone into the larger cross-sectional area regeneration zone and continuously move in a relatively compact descending bed therethrough. It may be noted that in the present unitary apparatus a cone-shaped partitioning member within the vessel 1, forms the lower end of the reaction zone 2 and provides means for supporting a cylindrically shaped section 17, which in turn provides an annular shaped stripping and sealing zone circumscribing the internal riser 9.

In accordance with the present invention, an air or oxygen-containing reactivating stream is introduced by way of line 18 and valve 19 into vertically extending distributing means 20 having a perforate surface suitable to distribute the air stream substantially laterally or horizontally into the descending bed of catalyst particles. Thus, the oxygen containing stream passes horizontally through the bed of particles to spaced collecting means 21 and resulting combustion and flue gases are withdrawn from the latter by way of control valve 22 and outlet line 23. As noted in connection with the reaction zone, the distributing and collecting means 20 and 21 respectively, may comprise a plurality of perforate surfaces defining a plurality of fluid channels, such that the gaseous stream is discharged and passed laterally through substantially the entire cross-sectional area of the descending bed of catalyst maintained within the regeneration zone 4, and such that there is a relatively low pressure drop in effecting the passage of the fluid stream from one zone to the other.

It is a principal advantage of the present invention to effect lower pressure drops than may be obtained by attempting to pass a reactant or regenerating stream vertically through a substantially deep and relatively compact bed of catalyst material. Maintaining lower pressure drops in turn means lower overall operating pressures and a more economical processing unit. For example, by passing the air stream through vertically extending distributing means and horizontally through the descending bed of particles to relatively closely spaced collection sections, low pressure drops of the order of less than 5 pounds pressure may be effected. Thus, the charge stream need not be compressed to a high pressure which might otherwise be required to overcome a high pressure drop through a deep bed of catalyst, and large expensive compressor apparatus is not required.

In the present continuous descending bed unit, reactivated and heated catalyst particles are continuously withdrawn by way of a standpipe 5 in order to mix with and commingle with the hydrocarbon charge stream entering by way of line 7, as hereinbefore set forth. A stripping and sealing gas stream, such as steam may also be introduced by way of line 24 and control valve 25, into the lower end of standpipe 5 such that the reactivated catalyst particles are stripped of entrained flue gases, and so that air does not pass downwardly through the line 5 to become commingled with the hydrocarbon charge stream.

Figure 2 of the drawing indicates diagrammatically a cross-sectional plan view through a typical contacting unit having an enclosing chamber 26 and an internal riser line 27, with a plurality of tubular shaped distributing and collecting units spaced throughout the entire cross-sectional area of a descending bed of catalyst particles in the contacting zone. A plurality of spaced elongated and perforated distributing units are indicated as D, while a plurality of tubular perforated units for collecting a vapor or gas are indicated by C. Thus, with perforations extending circumferentially around each of the tubular units, a gas or vapor may be distributed laterally and horizontally throughout the entire cross-sectional area of the descending bed of catalyst particles and into the spaced collecting unit C which are arranged to uniformly collect and withdraw the resulting product streams from the bed. Suitable ring shaped headers or connecting pipes are not indicated in the drawing, but may be connected and arranged in a manner to uniformly distribute a common fluid medium and uniformly collect a common product stream.

Referring now to Figure 3 of the drawing, there is indicated the lower portion of a chamber 1', suitable to enclose the lower portion of a continuously descending bed of catalyst particles and defining in this instance a regenerating zone, which in turn has a plurality of superimposed contacting zones or sections such as a lower zone 28, an intermediate zone 29 and an upper zone 30. While the present embodiment shows three stages or super-imposed zones, it is of course not intended to limit the present operation to any number of stages. Also, while the present description is directed to the regeneration of a contacted and coked catalyst bed which continuously descends from an upper reaction zone, it should be noted that the present plurality of stages or superimposed zones may be utilized to effect contacting of any fluid reactant stream with a descending bed of particles, either catalytic in nature, or inert and having heat carrying ability.

An air stream is introduced into the lower zone of the regenerator 1' by way of line 31 and control valve 32 and distributing means 33. The air leaves the perforate surface of the distributing means 33 and passes substantially horizontally through the descending catalyst bed in the lower zone 28 and into suitable perforate collecting means 34. The latter in turn channels or passes the partially used regenerating medium to a distributing means within the intermediate zone 29. The present embodiment indicates a novel structural arrangement whereby a single long tubular element 34 has perforations extending substantially throughout the entire height thereof and through both the lower and intermediate zones. Thus, the gas withdrawn into the lower end of the tubular unit 34 may be channeled upwardly to the distributing end thereof, where perforations in the surface pass the regenerating medium laterally and substantially horizontally through the intermediate zone 29 into a collecting and distributing tube 35. Here again, partially used regenerating gas is collected in the lower perforate means and channeled upwardly to the distributing means which comprises additional perforate surface suitable to pass the regenerating gas outwardly therefrom in a horizontal direction through the descending catalyst bed in the upper zone 30. A substantially used regenerating medium or flue gases are withdrawn from collecting means 36 by way of valve 37 and outlet line 38. In this arrangement, the regenerating medium passes laterally through a lower zone then vertically upward to a next higher zone and laterally through that zone prior to passing vertically upward to a still higher zone, until the medium reaches the uppermost zone of the regenerating section from which it is withdrawn or discharged from the chamber. This embodiment illustrates how a fluid reactant stream may contact a descending bed in a stage-wise manner, while at the same time effecting a lateral or substantially horizontal flow throughout all sections of the vertically descending bed of particles. Either countercurrent flow or concurrent flow may be utilized with respect to the descending bed of catalyst particles, the gaseous medium passing upwardly from a lower zone to an uppermost zone as described in the present embodiment, or alternatively, the gaseous medium passing from an uppermost zone downwardly through intermediate zones to a lower zone. The countercurrent flow is particularly advantageous for the regeneration of a catalyst medium by air or an oxygen-containing stream, inasmuch as the fresh stream may be introduced into the lower portion of the bed where a greater portion of the carbonaceous deposit has been burned and removed from the particles, and a resulting substantially used regenerating medium of a low oxygen content encounters the catalyst particles entering the regeneration zone and having a high carbon content. Excessive burning and resulting high temperatures within the catalyst bed are thus more readily precluded in the countercurrent operation.

The distributing and collecting means indicated in each of the superimposed zones of the contacting chamber of Figure 3 are purely diagrammatic, and as previously pointed out a plurality of distributing and collecting tubes may be utilized within each zone. Also, various shapes or forms of perforate members may be utilized to effectively distribute and collect the gaseous medium in each zone and to uniformly traverse the entire descending bed of particles. A convenient construction for elongated and vertically extending tubular members is indicated in connection with the present embodiment, with a single tubular element operating as both collecting and distributing means. For example, the member 34 utilizes its lower perforate surface and internal channel as a collecting passageway while the upper portion distributes the collected gases to an intermediate zone of the chamber. It should be noted however in connection with the superimposed stages of contact, that the distributing and collecting units should be spaced from one another vertically sufficiently to prevent by-passing of the gaseous streams in a vertical flow. In other words, the flow through each stage or superimposed zone should be substantially horizontal or lateral between distributing and collecting sections and vertically through confined channels, which may be within the perforate elements themselves or within non-perforate conduits connecting the latter, and no vertical flow directly contacting the descending bed of catalyst particles. Thus, with all flow through the particles being effected in a lateral or horizontal manner, the various distributing and collecting elements may be spaced and arranged to effect very low pressure drops in the passage through the bed or such optimum pressure drops as may be desired for the overall operation of the unitary apparatus.

Where a plurality of stages of contact are desired in either a conversion zone or regeneration zone, the vertically superimposed stages may be separated by zones where the catalyst particles are passed through restricted cross-sectional area spaces, however, by the careful arrangement and spacing of the collecting and distributing elements extending vertically throughout the descending bed of particles, it is possible to maintain the horizontal flow through each of the superimposed zones without danger of by passing portions of the bed and having vertical flow of the gaseous or vaporous medium directly through the catalyst bed. The present distributing collecting means of course may be used in connection with other than hydrocarbon conversion units and in single chamber or zone processing operations, however, the improved means for effecting the horizontal flow and low pressure drops through relatively compact beds of subdivided solid particles is believed to have particular advantage in connection with the catalytic conversion of hydrocarbon streams and the continuous regeneration of catalyst particles in the various operations which are of a continuous cyclic nature with the catalyst being passed continuously from one zone to another.

I claim as my invention:

1. A contacting apparatus comprising a vertically disposed chamber, a riser conduit extending upwardly though the central portion of the chamber and terminating in an open end in the upper portion of the chamber, means for passing a mixture of solid particles and fluid upwardly through said conduit and for maintaining a bed of the solid particles in the chamber at a level below said open end of the conduit, a perforated vertical conduit within the chamber on one side of said riser conduit and having an open upper end near the upper open end of said riser conduit, a second perforated vertical conduit within the chamber below the open end of said riser conduit and disposed laterally opposite the first-mentioned perforated conduit on the other side of the riser conduit, and means for removing fluid from said second perforated conduit.

2. A contacting apparatus comprising a vertically disposed chamber, means for passing subdivided particles of solid material downwardly through said chamber, a vertical conduit within said chamber on one side of the vertical center line thereof and having perforations over a substantial portion of its length, means for supplying fluid to said conduit, a second perforated vertical conduit within and on the other side of the vertical center line of the chamber laterally opposite and of a length substantially coextensive with the perforated portion of the first-mentioned conduit, and means for removing fluid from said second conduit.

3. A contacting apparatus comprising a vertically disposed chamber, a riser conduit extending upwardly through the central portion of the chamber and terminating in an open end in the upper portion of the chamber, means for passing a mixture of solid particles and fluid upwardly through said conduit, a plurality of perforated vertical conduits spaced laterally over the cross-sectional area of the chamber around said riser conduit, means for introducing fluid to some of said perforated conduits, and means for removing fluid from others of said perforated conduits.

References Cited in the file of this patent
UNITED STATES PATENTS

| Number | Name | Date |
| --- | --- | --- |
| 2,417,399 | Simpson et al. | Mar. 11, 1947 |
| 2,440,475 | Jacomini | Apr. 27, 1948 |
| 2,487,961 | Angell | Nov. 15, 1949 |
| 2,534,859 | Evans | Dec. 19, 1950 |
| 2,542,887 | Watson | Feb. 20, 1951 |
| 2,552,063 | Robinson | May 8, 1951 |